R. W. HASKINS.
Protecting Vessels from Lightning.
No. 20,877. Patented July 13, 1858.
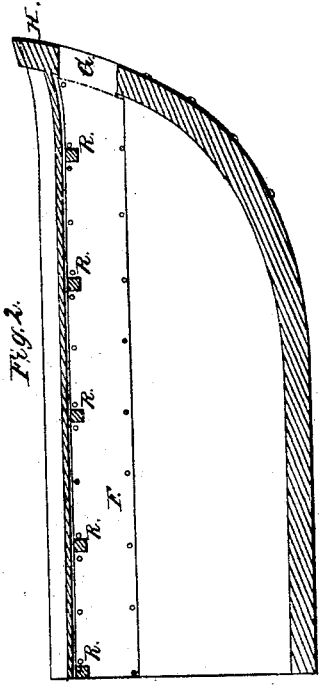
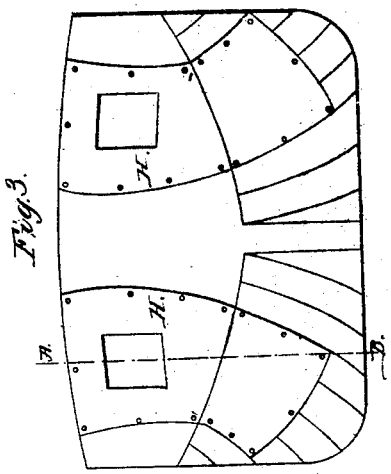
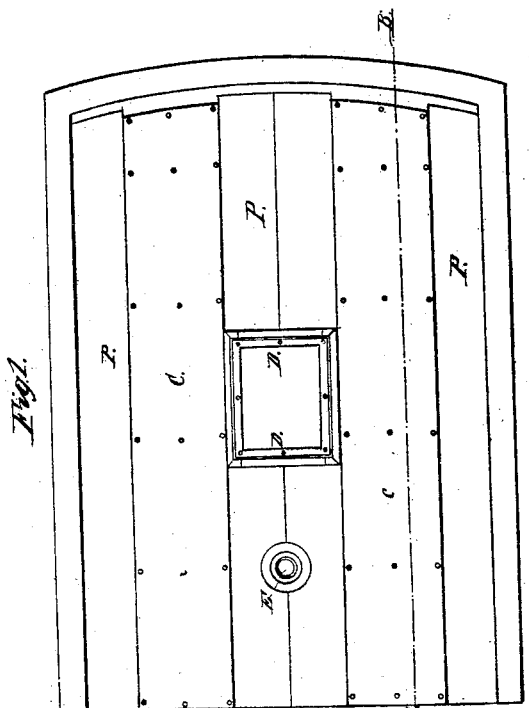

UNITED STATES PATENT OFFICE.

R. W. HASKINS, OF BUFFALO, NEW YORK.

IMPROVED METHOD OF COPPERING THE INTERIOR OF SHIPS TO PROTECT THEM FROM LIGHTNING.

Specification forming part of Letters Patent No. 20,877, dated July 13, 1858.

*To all whom it may concern:*

Be it known that I, ROSWELL W. HASKINS, of Buffalo, in the county of Erie, in the State of New York, have invented a new and Improved Mode of Protecting Vessels from Lightning; and I do hereby declare that the following is a full and exact description thereof, reference being had to the accompany drawings, and to the letters of reference marked thereon.

The nature of my invention relates to protecting vessels from lightning by means of lining all parts of the vessel above the water-line on the inside with metal, and making a proper connection thereof through the cabin-windows and other openings through the vessel to sheets of metal passing down the stern and sides of the vessel to the water.

To enable others skilled in the art to make and use my invention, I will proceed to describe the same.

Figure 1 is a section-plan of the deck of a vessel lined with sheets of copper or other metal, showing my improvement. Fig. 2 is a section of the same through the line A B, Figs. 1 and 3. Fig. 3 is an elevation of the stern, showing the mode of passing the conducting-metal out of the cabin-windows and down the stern to the water.

The principles which have guided me to my improvement are as follows: Lightning never explodes or gives off a spark except when deprived of perfect conduction, and it never burns without the spark or when deprived of sufficient conduction. On land explosions of electricity frequently take place upward or from the earth, but on the water never, because water furnishes so good and perfect a conductor of electricity that it will not explode in that element. Ships are only in danger from lightning from above, or from the atmosphere, and they can only be struck by lightning in some part which is above the water. Lightning-rods do not afford complete protection to vessels, for the reason that electrical explosions do not always take place in a line perpendicular to the earth nor in a direction to be caught by the rods. On the contrary, in a majority of cases lightning approaches the vessel in a direction other than vertical to the surface of the water, and is as likely to strike on one angle as another. In many cases it misses the masts of the vessel and lightning-rod, while it reaches the hull. Sometimes it strikes the chain-plates, sometimes the bowsprit, and sometimes other parts of local attraction, and when once on board the fluid will, in its endeavor to reach the water where it can be diffused, explode or give out a spark as it passes from one point of conduction to another, and it is this spark which sets fire to cotton, flax, hemp, (either raw in bales or in the manufactured article,) gunpowder, and other combustible substances, and thereby destroys the ship.

My improvement is intended to provide a remedy against all these difficulties by affording ample conducting-surface from all parts of the vessel (where it is possible for lightning to strike) to the water.

In Fig. 1, C shows a copper lining for the deck of the vessel. This is laid onto the deck-beams under the planking. A portion of the planking of the deck is left off in order to show the metal. This copper lining is also laid over the combings of the hatchway, as represented at D, and around the masts, as represented at E. The masts should be covered with the metal sheets near the deck and connected to this metal lining, so that lightning passing down the masts will be caught by the metal lining and conducted to the water. The same should be done with the bowsprit. The insides of the vessel are also covered with metal down to the water-line, as represented at F, Fig. 2. The metal extends over the casing and through the cabin-windows, as represented at G. It also passes down the outside of the vessel to below the water-line, as represented at H H, Figs. 2 and 3. The sheets of metal are so laid on and connected to each other as to form one entire sheet of perfect and uninterrupted conduction from the deck and sides of the vessel inside to the water on the outside.

All the openings in the deck should be well laid with the metal, and a perfect connection thereof made to the metal lining of the deck and sides, as aforesaid. I prefer sheets of copper for all these purposes.

P is the deck-planking; R, deck-beams.

The openings through the vessel, such as the privies, port-holes, windows, &c., should also be well laid with metal and connected to the broad sheet on the inside of the vessel, and to the water on the outside, so as to afford all the facilities possible for the electric fluid to escape from the vessel and become diffused in the water.

Great care should be taken that the different sheets and strips of metal are thoroughly soldered at their joinings, so as to insure the passage of the lightning on the metal without interruption and without a spark. This arrangement will in all cases intercept and catch the lightning before it can reach the cargo or any combustible material, and conduct safely out of the ship and into the ocean any electrical fluid which may have made its way into the ship from the atmosphere, and thus preserve the lives and the property of those concerned. I have represented the copper lining as being on the under side of the deck, for the purpose of preventing the same being marred by handling freight thereon, and because it might be too slippery for the convenience of the seamen, but I contemplate the application of my improvement to the upper side of the deck and the outside of the vessel in all cases where the same may be practicable.

I make no claim to lightning-rods in any mode in which they are now used.

What I do claim, and desire to secure by Letters Patent, is—

Protecting vessels from lightning by means of metal linings, arranged substantially as herein described.

R. W. HASKINS.

Witnesses:
  F. L. BALDWIN,
  W. H. FORBUSH.